(12) United States Patent
Velazquez et al.

(10) Patent No.: US 9,118,513 B2
(45) Date of Patent: Aug. 25, 2015

(54) ADAPTIVE DIGITAL RECEIVER

(71) Applicants: Scott R. Velazquez, San Diego, CA (US); Richard J. Velazquez, San Diego, CA (US)

(72) Inventors: Scott R. Velazquez, San Diego, CA (US); Richard J. Velazquez, San Diego, CA (US)

( * ) Notice: Subject to any disclaimer, the term of this patent is extended or adjusted under 35 U.S.C. 154(b) by 51 days.

(21) Appl. No.: 14/044,869

(22) Filed: Oct. 2, 2013

(65) Prior Publication Data

US 2014/0133603 A1    May 15, 2014

Related U.S. Application Data

(60) Division of application No. 13/455,071, filed on Apr. 24, 2012, now Pat. No. 8,582,694, which is a continuation of application No. 12/908,783, filed on Oct. 20, 2010, now Pat. No. 8,164,496, which is a continuation of application No. 12/817,075, filed on Jun. 16, 2010, now Pat. No. 7,940,198, which is a continuation-in-part of application No. 12/112,380, filed on Apr. 30, 2008, now Pat. No. 7,782,235.

(60) Provisional application No. 60/915,110, filed on Apr. 30, 2007.

(51) Int. Cl.
| | |
|---|---|
| *H03M 1/12* | (2006.01) |
| *H04L 25/02* | (2006.01) |
| *H04B 1/00* | (2006.01) |
| *H04L 25/14* | (2006.01) |
| *H04L 27/00* | (2006.01) |

(52) U.S. Cl.
CPC ............... *H04L 25/02* (2013.01); *H04B 1/001* (2013.01); *H04L 25/14* (2013.01); *H04L 27/0006* (2013.01); *H04L 27/0012* (2013.01)

(58) Field of Classification Search
CPC .......... H03M 1/0624; H03M 1/1215; H03M 1/0863; H03M 1/0836; H04L 25/03057; H04L 7/0062
USPC ........... 375/340, 260, 240, 146, 436, E1.002; 330/151; 342/377, 383; 455/59, 296
See application file for complete search history.

(56) References Cited

U.S. PATENT DOCUMENTS

| | | | | |
|---|---|---|---|---|
| 6,724,840 | B1 * | 4/2004 | Osofsky et al. | 375/346 |
| 6,999,541 | B1 * | 2/2006 | Hui | 375/350 |
| 7,336,729 | B2 * | 2/2008 | Agazzi | 375/316 |
| 7,418,043 | B2 * | 8/2008 | Shattil | 375/260 |
| 7,778,286 | B2 * | 8/2010 | Agazzi et al. | 370/516 |
| 8,098,751 | B2 * | 1/2012 | Shattil | 375/260 |
| 2002/0031234 | A1 * | 3/2002 | Wenger et al. | 381/86 |
| 2004/0141548 | A1 * | 7/2004 | Shattil | 375/146 |
| 2006/0208945 | A1 * | 9/2006 | Kolanek | 342/377 |
| 2008/0310484 | A1 * | 12/2008 | Shattil | 375/146 |
| 2010/0085231 | A1 * | 4/2010 | Doris | 341/155 |

* cited by examiner

*Primary Examiner* — Lam T Mai
(74) *Attorney, Agent, or Firm* — San Diego IP Law Group LLP

(57) ABSTRACT

The present invention provides a high-performance adaptive digital receiver with adaptive background control that optimizes the performance in rapidly changing signal environments and provides 3.6 GHz instantaneous bandwidth, SFDR>90 dB, SNR=66 dB, with dynamic digital channelization. The receiver takes advantage of several levels of adaptivity that conventional approaches do not offer. In addition to a dynamic digital channelizer that is adaptively tuned based on detected signals, the present invention employs a powerful software reconfigurable digitizer that is adaptively optimized for the current signal environment to control important receiver parameters such as bandwidth, dynamic range, resolution, and sensitivity.

8 Claims, 11 Drawing Sheets

ADAPTIVE DIGITAL RECEIVER

CROSS-REFERENCE TO RELATED APPLICATIONS

This application is a divisional of U.S. patent application Ser. No. 13/455,071, filed Apr. 24, 2012, and entitled "Adaptive Digital Receiver," which is a continuation-in-part of U.S. patent application Ser. No. 12/908,783, filed Oct. 20, 2010, and entitled "Mismatch Compensators and Methods for Mismatch Compensation," which is a continuation of U.S. patent application Ser. No. 12/817,075, filed Jun. 16, 2010, which is a continuation-in-part of U.S. patent application Ser. No. 12/112,380, filed Apr. 30, 2008, which claims priority under 35 U.S.C. §119(e) to U.S. Provisional Patent Application Ser. No. 60/915,110, filed Apr. 30, 2007, the entire disclosures of which are all hereby incorporated by reference.

BACKGROUND OF THE INVENTION

1. Field of Invention

This invention relates to digital receivers and more specifically, to a high performance digital receiver architecture with adaptive background control that optimizes performance of the digital receiver in rapidly changing signal environments.

2. Description of Related Art

The dynamic nature of the modern RF environment presents challenges to future digital receivers. Current fixed channel receivers are inadequate to efficiently process a dynamic and changing RF signal environment.

U.S. Pat. No. 7,006,474 to Oates discloses a conventional channelized receiver comprising a digitizer and channelizer. However, its only means for responding to changes in the signal environment is to detect and select which channels from the channelizer have active signal content (above a certain amplitude threshold). It fails to adaptively reconfigure the digitizer in order to control important receiver parameters such as bandwidth, dynamic range, resolution, and sensitivity.

SUMMARY OF THE INVENTION

The present invention overcomes these and other deficiencies of the prior art by taking advantage of several levels of adaptivity that conventional receivers do not offer. In addition to a dynamic channelizer that is adaptively tuned based on detected signals, the present invention also includes a powerful software reconfigurable digitizer that is adaptively optimized for the current signal environment to control important receiver parameters such as bandwidth, dynamic range, resolution, and sensitivity. This approach adaptively adjusts the signal processing to provide optimal performance for the current signal environment. The adaptive adjustment uses heuristic and iterative approaches for identification of signals of interest and jammer/interference signals for tuning the digital channelizer and for selecting appropriate high-performance digital signal processing techniques to trade off bandwidth, dynamic range, resolution, and sensitivity.

The present invention employs a signal detection algorithm that uses techniques such as statistical, spectral, and wavelet analysis to identify the location, bandwidth, level, and modulation type of signals of interest and jammer/interference signals. The present invention also employs an adaptive real-time control algorithm that uses heuristic and iterative approaches to tune a dynamic digital channelizer and to select the appropriate DSP algorithms for the current conditions. The dynamic channelizer uses an efficient polyphase filter bank structure to provide multiple channelized outputs with arbitrary and independent center frequency, bandwidth, gain, and cut-off characteristics. The powerful signal processing technologies can be changed on-the-fly without disruption of the receiver's normal operation to effectively track signal conditions as they change. One technique, called Adaptive Parallel Combining (APC), uses a parallel array of high-speed, high-resolution analog-to-digital converters (ADCs) with adaptive signal combining to dramatically improve resolution (both SNR and SFDR) of the digitization while maintaining very high sample rate. A complementary technique, called Advanced Filter Bank (AFB) also uses an array of ADCs, but it greatly improves the bandwidth of the digitization while maintaining high resolution (e.g., four converters can be used to quadruple the bandwidth). Additional techniques include: LinComp linearity compensation to improve SFDR and increase analog input bandwidth; averaging of multiple ADCs to improve SNR; channel extraction to capture a desired narrowband; channel matching to digitize multiple channels (e.g., antenna elements) with finely-matched gain and phase; and accurate I/Q demodulation.

In an embodiment of the invention, an adaptive digital receiver comprises: a software reconfigurable digitizer, wherein the software reconfigurable digitizer digitizes an input analog radio frequency signal into a digitized signal, a digital channelizer, wherein the digital channelizer processes the digitized signal into a channelized signal, a signal detection algorithm, wherein the signal detection algorithm identifies one or more signal characteristics of the channelized signal, and an adaptive control algorithm, wherein the adaptive control algorithm optimizes the performance of the software reconfigurable digitizer and the digital channelizer based on the identified one or more signal characteristics of the channelized signal. The software reconfigurable digitizer comprises an array of analog-to-digital converters. The adaptive control algorithm selects one or more digital signal processing techniques implemented by the software reconfigurable digitizer from a plurality of available digital signal processing techniques. The plurality of available digital signal processing techniques are selected from the group consisting of: advanced filter bank processing, linear compensation processing, adaptive parallel combining processing, averaging processing, advanced channel matching processing, gain and phase compensation processing, and any combination thereof. The adaptive control algorithm provides input to the software reconfigurable digitizer to enhance the identified one or more signal characteristics of the channelized signal. The adaptive digital receiver may further comprise a user interface to permit a user to select one or more signal characteristics of the channelized signal. The software reconfigurable digitizer is adaptively optimized to control receiver operating parameters. The operating parameters are selected from the group consisting of: bandwidth, dynamic range, resolution, sensitivity, and any combination thereof. The digital channelizer can provide simultaneous wideband, lower resolution and narrowband, high resolution outputs. The adaptive control algorithm maintains a history of one or more signals of interest, one or more jamming signals, and an associated software reconfigurable digitizer configuration to update one or more operating parameters.

In another embodiment of the invention, a reconfigurable digitizer comprises: an array of analog-to-digital converters, and digital signal processing logic, wherein the digital signal processing logic is reconfigurable based on input from a user or a detected signal environment. Reconfiguring the digital signal processing logic changes an operating parameter of the array of analog-to-digital converters, wherein the operating parameter is selected from the group consisting of: bandwidth, resolution, sensitivity, dynamic range, and any combination thereof. The digital signal processing logic is continually updated based on the detected signal environment. The array of analog-to-digital converters can be reconfigured to operate in a plurality of modes. The plurality of modes are selected from the group consisting of: wideband mode, high-resolution mode, multi-channel mode, automatic gain control mode, and any combination thereof. The wideband mode combines the outputs from two or more analog-to-digital converters in the array of analog-to-digital converters. The high-resolution mode averages the outputs from two or more analog-to-digital converters in the array of analog-to-digital converters. The multi-channel mode uses each analog-to-digital converter in the array of analog-to-digital converters as an independent channel. The automatic gain control mode allocates a level of gain to each analog-to-digital converter in the array of analog-to-digital converters.

The present invention determines the desired center frequency and bandwidth of the dynamically reconfigurable ADC and automatically employs the appropriate DSP techniques to optimize the performance (i.e., sample rate, bandwidth, resolution, power etc.). This highly adaptable and reconfigurable architecture supports numerous different operating modes and even simultaneous outputs (e.g., a wideband, lower-resolution signal for detection and a simultaneous narrowband, high-resolution signal for data analysis, both using the same ADC hardware).

An advantage of the present invention is that it provides 3.6 GHz instantaneous bandwidth, SFDR>90 dB, SNR=66 dB, with dynamic digital channelization. This represents a breakthrough in wideband, high-resolution adaptive digitization and provides receiver performance well beyond current state-of-the-art. The DSP technologies used in the architecture are customizable for different applications since the core architecture can employ more channels of A/D conversion for wider bandwidth and can use higher resolution converters (with lower bandwidth) if necessary. In addition, the performance of the present invention will always exceed the current state-of-the-art since the technology is flexible and can be applied to new converters with higher performance as they become available in the future. Moreover, the open nature of the present invention's architecture readily allows the inclusion of existing and future DSP algorithms.

The extremely wide bandwidth and high dynamic range of the present invention allows the accurate detection of very small signals in an environment with high-power interference, such as co-site inference or jamming situations. The present invention provides an extremely powerful receiver capable of capturing and processing signals in very challenging environments in a compact, low-power package. This represents a core technology that is extremely important for many airborne, shipboard, satellite, and terrestrial RF receiver applications.

The foregoing, and other features and advantages of the invention, will be apparent from the following, more particular description of the preferred embodiments of the invention, the accompanying drawings, and the claims.

BRIEF DESCRIPTION OF THE DRAWINGS

For a more complete understanding of the present invention, the objects and advantages thereof, reference is now made to the ensuing descriptions taken in connection with the accompanying drawings briefly described as follows.

DETAILED DESCRIPTION OF EMBODIMENTS

Figure 1:
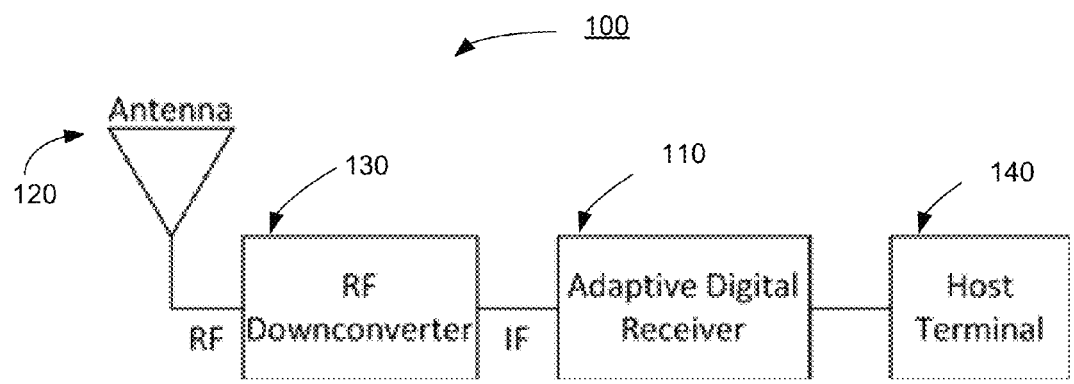
FIG. 1 illustrates an adaptive digital receiver system according to an embodiment of the invention.

Further features and advantages of the invention, as well as the structure and operation of various embodiments of the invention, are described in detail below with reference to the accompanying FIGS. 1-19, wherein like reference numerals refer to like elements.

The present invention provides a digital receiver, which implements several levels of adaptivity that conventional approaches do not. In addition to a dynamic channelizer that is adaptively tuned based on detected signals, the present invention also includes a powerful software reconfigurable digitizer that is adaptively optimized for the current signal environment to control important receiver parameters such as bandwidth, dynamic range, resolution, and sensitivity. An adaptive real-time control algorithm is employed using information on the current signal environment from a signal detection algorithm to adaptively adjust not only the dynamic channelizer, but also the software reconfigurable digitizer.

This approach adds critical levels of adaptivity early in the receiver signal chain to optimize the digitizer's hardware capabilities (e.g., instantaneous bandwidth, spurious free dynamic range, signal to noise ratio, signal gain) based on the current signal environment, and to quickly adapt to changes in the environment.

In an embodiment of the invention, the dynamic channelizer (a.k.a., adaptive channelizer) implements an efficient polyphase filter bank structure to provide multiple channelized outputs with arbitrary and independent center frequency, bandwidth, gain, and cut-off characteristics. The software reconfigurable digitizer implements an array of state-of-the-art converters and takes advantage of several high-performance digital signal processing (DSP) techniques to trade off bandwidth, dynamic range, resolution, and sensitivity. The signal detection algorithm uses statistical, spectral, and/or wavelet analysis techniques to identify the location, bandwidth, level, and modulation type of signals of interest and jammer/interference signals. The adaptive real-time control algorithm uses heuristic and iterative approaches to tune the dynamic channelizer and to select the appropriate DSP algorithms for optimal performance in a rapidly changing signal environment.

The powerful signal processing techniques employed by the present invention can be changed on-the-fly without disruption of the receiver's normal operation to effectively track signal conditions as they change. In an embodiment of the invention, DSP algorithms are all simultaneously resident in an integrated circuit such as a field-programmable gate array (FPGA) for immediate activation as needed without disruption of the normal operation of the receiver. One technique, called adaptive parallel combining (APC), uses a parallel array of high-speed, high-resolution analog-to-digital converters (ADCs) with adaptive signal combining to dramatically improve resolution, e.g., both signal-to-noise ratio (SNR) and spurious-free dynamic range (SFDR), of the digitization while maintaining very high sample rate. A complementary technique, called advanced filter bank (AFB) also uses an array of ADCs, but it greatly improves the bandwidth of the digitization while maintaining high resolution, e.g., four converters can be used to quadruple the bandwidth. Additional techniques include: linearity compensation (LinComp) to improve SFDR and increase analog input bandwidth; averaging of multiple ADCs to improve SNR; channel extraction to capture a desired narrowband; channel matching to digitize multiple channels (e.g., antenna elements) with finely-matched gain and phase; and accurate I/Q demodulation. Using heuristic analysis techniques, this architecture dynamically activates the appropriate DSP techniques to provide optimal performance for the current mode of operation (e.g., for very wideband spectrum monitoring, the AFB and linearity compensation techniques can be used; alternatively, for extracting narrowband channels, the APC, averaging, and channel extraction techniques can be used to provide extremely high-resolution). This approach also supports simultaneous outputs (e.g., a wideband, lower-resolution signal for detection and a simultaneous narrowband, high-resolution signal for data analysis, both sharing the same exact same ADC hardware but simultaneously employing different DSP functions).

FIG. 1 illustrates an adaptive digital receiver system 100 according to an embodiment of the invention. The adaptive digital receiver system 100 comprises an adaptive digital receiver 110, an antenna 120, a radio frequency (RF) downconverter 130, and a host terminal. The antenna 120 receives one or more analog RF signals and passes such to the RF downconverter 130, which converts the frequencies of the received RF signals to intermediate frequencies to be digitized and processed by the adaptive digital receiver 110. For example, RF communications signals transmitted at 10 GHz can be downconverted via the downcoverter 130 to an intermediate frequency of 1 GHz in order to be within the preferred operating range of the digital receiver 110. The implementation of (as well as identification of suitable components for) the antenna 120 and RF downconverter 130 is readily apparent to one of ordinary skill in the art. The host terminal 140 can be any type of digital hardware capable of using the digitized, channelized signals provided by the adaptive digital receiver 110. Identification and implementation of the host terminal 140 is also readily apparent to one of ordinary skill in the art. The host terminal 140 comprises a graphical user interface implemented on a computer system for the purpose of allowing a human operator to analyze received signals and select desired receiver functions.

Figure 2:
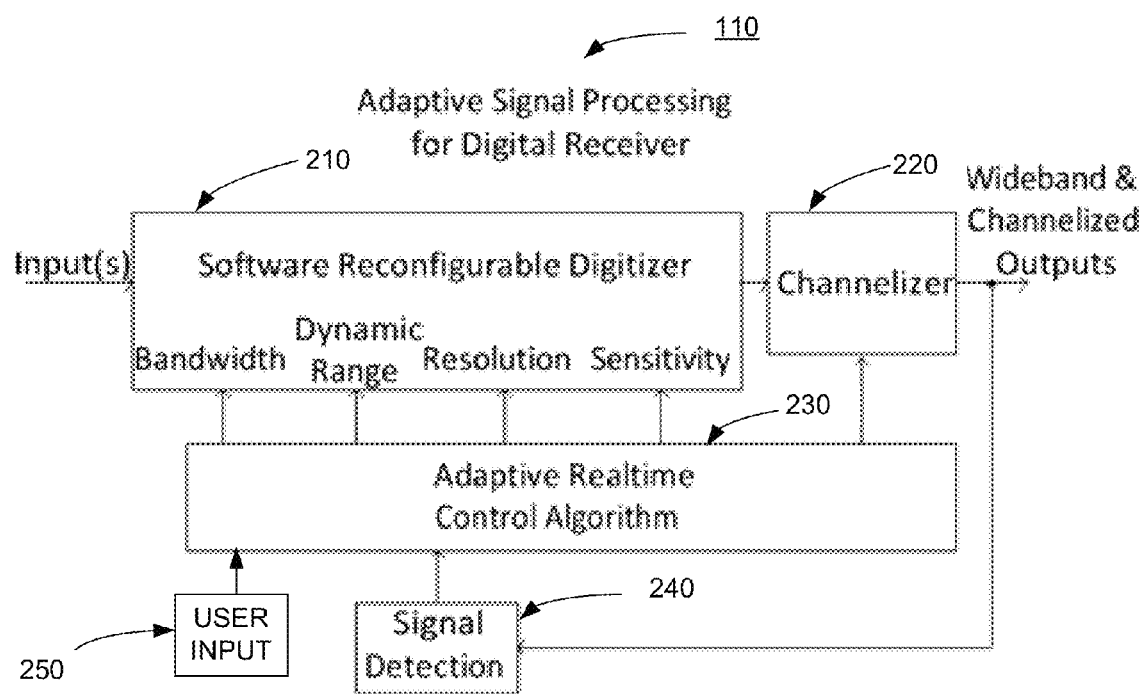
FIG. 2 illustrates the adaptive digital receiver of FIG. 1 according to an embodiment of the invention.

FIG. 2 illustrates the adaptive digital receiver 110 according to an embodiment of the invention. The adaptive digital receiver 110 comprises a software reconfigurable digitizer 210, a dynamic channelizer 220, an adaptive real-time control algorithm 230, a signal detection algorithm 240, and a user input interface 250. The adaptive real-time control algorithm 230 uses information on the current signal environment provided by the signal detection algorithm 240 to adaptively adjust the software reconfigurable digitizer 210 and the dynamic channelizer 220. For example, the software reconfigurable digitizer 210 is adaptively optimized to control important receiver parameters such as bandwidth, dynamic range, resolution, and sensitivity. Thus, the adaptive digital receiver 110 adds critical levels of adaptivity early in the receiver signal chain to continually optimize the dynamic channelizer's 220 hardware capabilities, e.g., instantaneous bandwidth, spurious free dynamic range, signal to noise ratio, signal gain, based on the current signal environment and to quickly adapt to changes in the signal environment. The user input interface 250 permits a user to interact with the adaptive real-time control algorithm 230 and select desired and/or optimal receiver attributes such as bandwidth, resolution, dynamic range, sensitivity, and channel locations. Conventional receivers do not permit adaptive control of the receiver's bandwidth, dynamic range, resolution, and sensitivity.

The signal detection algorithm 240 employs conventional signal analysis techniques such as, but not limited to statistical, spectral, and wavelet analysis, to identify the location, bandwidth, level, and modulation type of signals of interest and jammer/interference signals. Identification and implementation of the conventional signal analysis techniques are readily apparent to one of ordinary skill in the art.

As will be explained in further detail below, the adaptive real-time control algorithm 230 employs heuristic and iterative approaches to tune the dynamic channelizer 220 and to select one or more appropriate digital signal processing algorithms ("modes"), e.g., AFB, LinComp, and/or APC, for optimal performance. Specifically, the adaptive real-time control algorithm takes input from the user via the user input interface 250 and the signal detection algorithm 240 and uses iterative and heuristic techniques to determine optimal parameters for the software reconfigurable digitizer 210 and the dynamic channelizer 220. For example, the user may desire to track the 10 largest amplitude signals. The adaptive real-time control algorithm 230 catalogs the 10 largest amplitude signals detected by the signal detection algorithm 240, provides input to the dynamic channelizer 220 on the location and bandwidth of those signals so they can be extracted, and provides input to the digitizer 210 to activate one or more DSP techniques to enhance the detected signals. A wideband lower resolution mode may be activated for the signal detection algorithm 240 to continually monitor changes in the 10 largest amplitude signals (e.g., wideband mode uses advanced filter bank DSP as described below for increased bandwidth and optionally LinComp DSP as described below for increased dynamic range). Simultaneously, a high-resolution lower bandwidth mode may be activated for extraction of the 10 largest amplitude signals (i.e., the high resolution mode uses averaging DSP for increased resolution and optional LinComp for increased dynamic range). Depending on the location, bandwidth, and signal levels of the 10 largest signals, other DSP modes may be activated to enhance the fidelity of the digitization of the desired signals. For example, if the signal levels are varying significantly over time, an automatic gain control mode as described below can be activated using an APC DSP algorithm. Also, if the user would like to monitor signals from different and independent antenna sources, a multi-channel mode can be activated as described below. The adaptive control algorithm 230 continuously monitors the signal environment (via the signal detection algorithm 240) and the input from the user to update the configuration parameters for the digitizer 210 and channelizer 220 to maintain optimal performance. The adaptive control algorithm 230 also uses a heuristic method by maintaining a history of the signal environment (e.g., desired signal amplitude, bandwidth, frequency, the previously optimized channelizer parameters, previously optimized DSP mode selections, user input parameters, and a measure of the performance obtained. When conditions change, the adaptive control algorithm 240 will search this history for similar conditions that have occurred in the past to immediately provide near optimal parameters to the digitizer 210 and channelizer 220. This expedites the time required to update the system to changes in the environment and allows to system to respond to fast changes. The dynamic channelizer 220 employs an efficient polyphase filter bank structure to provide multiple channelized outputs with arbitrary and independent center frequency, bandwidth, gain, and cut-off characteristics.

Figure 3:
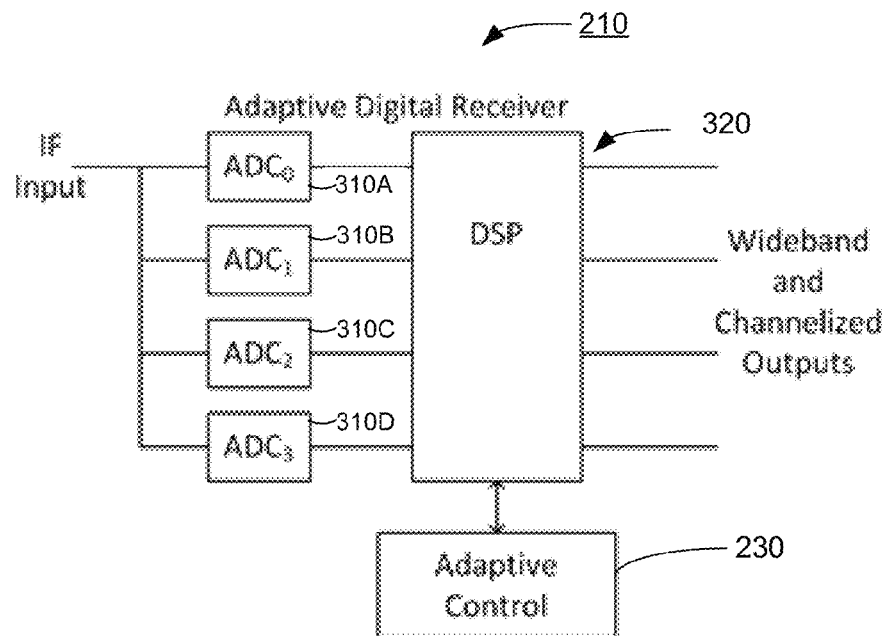
FIG. 3 illustrates the software reconfigurable digitizer of FIG. 2 according to an embodiment of the invention.

FIG. 3 illustrates the software reconfigurable digitizer 210 according to an embodiment of the invention. Here, the software reconfigurable digitizer 210 comprises an array of analog-to-digital converters (ADC) 310A-D and reconfigurable DSP algorithms 320 responsive to the adaptive real-time control algorithm 230. The use of four ADCs 310A-D as shown is exemplary only—the use of four ADCs 310A-D increases the bandwidth of the conversion by four times while maintaining very high resolution. Such an embodiment is capable of A/D conversion with, for example, 12-bit resolution and 7.2 GHz sample rate. One of ordinary skill in the art appreciates that any number of ADCs may be employed depending on the desired performance of the adaptive digital receiver 110. For example, eight ADCS could be used to increase the bandwidth of the conversion by eight times. The ADCs 310A-D are preferably state-of-the-art off-the-shelf analog-to-digital converters, the identification and implementation of which is readily apparent to one of ordinary skill in the art.

High-speed, high-resolution analog-to-digital and digital-to-analog conversion is a critical technology in many modern electronic systems, such as radar systems and digital receivers for wireless communications. In general, high-speed, high-resolution analog-to-digital converters enable wide bands of analog data to be converted to digital form that can be processed more accurately and efficiently than is possible in analog form. The adaptive digital receiver system 100 can be updated as requirements change and new standards arise by simply updating software to change the digital signal processing. High-performance analog-to-digital converters 310A-D significantly reduce the cost, size, and power consumption of the digital receiver system 100 by eliminating much of the analog front-end RF circuitry while improving versatility and performance.

The adaptive real-time control algorithm employs blind adaptive background analysis and heuristic analysis to dynamically adjust parameters of the DSP algorithms 320, e.g., frequency response, center frequency, and/or bandwidth, for optimal performance. The DSP algorithms 320 can be changed on-the-fly without disrupting the receiver's 110 normal operation in order to effectively track signal conditions as they change. As explained in further detail below, the adaptive digital receiver 210 supports various DSP algorithms 320 with selectable capabilities such as tuning, bandwidth, number of channels, resolution, and dynamic range. The adaptive real-time control algorithm 230 provides background monitoring of the signal environment with adaptive configuration updates such as: continuous wideband background monitoring for signals of interest (SOI) and jamming signals; identification of numerous SOI (e.g., frequency location, bandwidth, amplitude, waveform and modulation type); tracking of numerous simultaneous SOI (e.g., narrowband high-resolution outputs and adjustable bandwidths); heuristic tracking to maintain a history of SOI and jamming signals (e.g., frequency, bandwidth, and amplitude) and hardware/DSP configurations (e.g., DSP modes and channels) to immediately lock on previously tracked signals. These adaptive configuration updates can be applied on regular intervals for optimal tracking in changing signal environments.

In an embodiment of the invention, the adaptive digital receiver 210 employs advanced filter bank (AFB) processing to significantly reduce the analog mismatches, e.g., gain mismatch, phase mismatch, DC-offset error, which prohibit existing parallel architectures such as time-interleaving methods from achieving high-resolution. By eliminating much of the front-end analog electronics in the RF signal chain, the high-performance AFB processing significantly reduces the size, power, and cost of advanced communications systems, radar systems, adaptive array processing and digital beamforming, and other RF receivers by performing more of the processing digitally in reconfigurable software.

Using a filter bank for analog-to-digital conversion is a novel application and improves the speed and resolution of the conversion over the conventional time-interleaved array conversion technique (also called "Ping-Pong" or "Round-Robin" methods). The AFB uses a combination of time-division multiplexing to split the input to each ADC in the array and multirate digital filters to reconstruct the digitized signal. This multirate digital filtering in the AFB significantly increases the speed of the conversion by essentially attenuating the effects of analog mismatches (i.e., gain mismatch, phase mismatch, and DC-offset caused by imprecise analog component values, line length mismatches, and other variations in the analog front-end electronics) which otherwise severely limit the resolution of the system and which prohibit existing parallel architectures from achieving high-resolution. To achieve high-resolution (greater than 12 bits), conventional parallel approaches such as time-interleaving require phase matching on the order of femtoseconds and gain matching better than 0.1%, which is very difficult (if not impossible) to achieve with analog circuit techniques. However, the AFB provides very high-resolution performance by very accurately correcting the mismatches between the converters across the entire bandwidth using precisely calibrated digital FIR filters.

Figure 4:
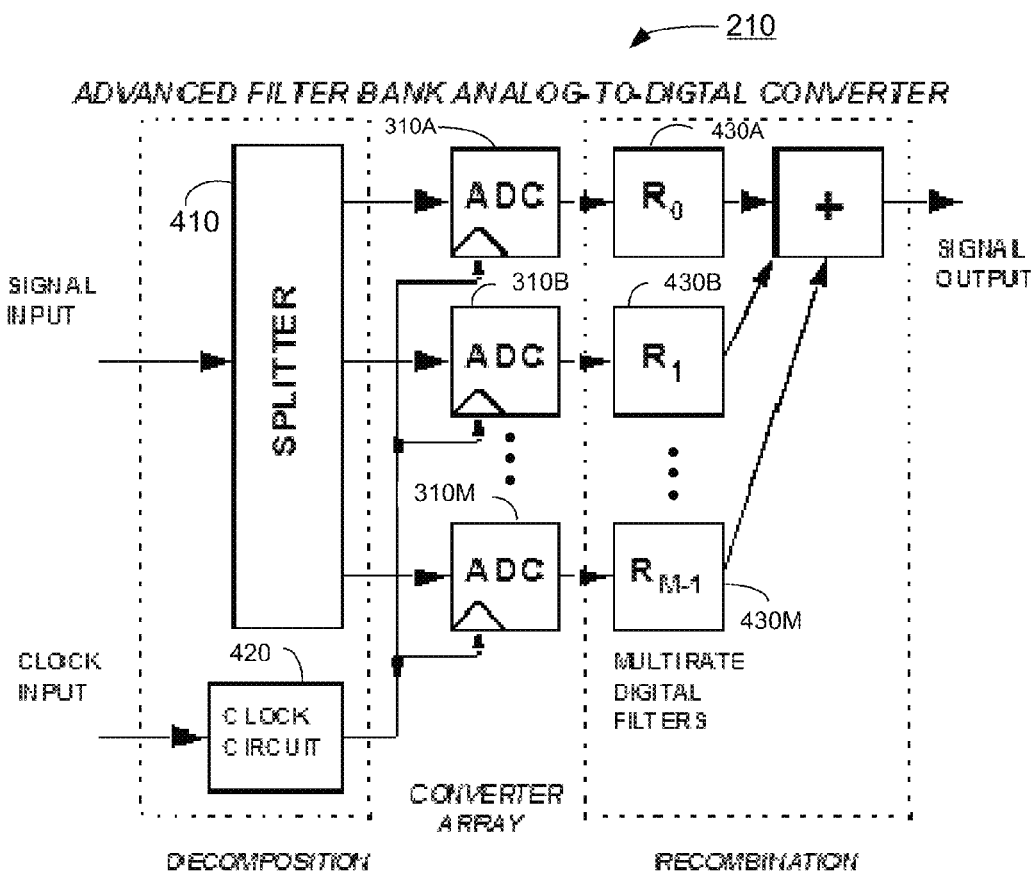
FIG. 4 illustrates the software reconfigurable digitizer of FIG. 2 operating in an advanced filter bank DSP mode according to an embodiment of the invention.

FIG. 4 illustrates the digitizer 210 operating in an advanced filter bank DSP mode according to an embodiment of the invention. Here, the digitizer 210 comprises a parallel array of M analog-to-digital converters 310A-M to increase the speed of the conversion by a factor of M while maintaining the high-resolution of the individual converters. An RF splitter 410 is implemented to divide the wideband analog input signal into M signals, one for each converter 310A-M. Time-skewed channel clock signals from a clock circuit 420 are used for time-division multiplexing of each of the converters 310A-M. The channel signals are sampled at 1/M the effective sample rate of the receiver system 100 and converted to digital signals with n-bit ADCs. The digitized channel signals are upsampled by M and reconstructed via the digital recombination filters 430A-M, Rk(z). The effective sample rate of the system is M times that of the channel ADCs in the array 310A-M, and the resolution is n bits, which is the same high-resolution of the channel ADCs in the array.

The recombination filters 430A-M precisely correct the gain and phase mismatches between the converters in the array. Even slight mismatches between the converters can introduce large distortion products in the system output (called "images" since they are copies or images of the signal shifted in frequency within the desired band). They appear similar to harmonic or intermodulation distortion and can severely limit the SFDR of the system. Note that the recombination filters 430A-M do not simply attenuate these distortion products (e.g. with a notch filter). They introduce a small correction signal that, when added to the ADC output, corrects the mismatches and thereby minimizes the image spur distortion products. Therefore, these distortion products can be accurately eliminated even if a desired signal overlaps the distortion in the frequency domain.

The AFB DSP mode uses gain and phase measurements to generate the distortion artifacts ("images") which are then subtracted from the output. The original signal passes through the processing unmodified, while the digital filters are used to adjust the amplitude and phase of the interleaved distortion artifacts so they can be effectively subtracted from the output. These raw artifacts typically have amplitude of roughly −40 dBc. For low-level signals (e.g., −60 dBFS or lower), the interleaving artifacts are extremely low (−100 dBFS or lower). Therefore, the AFB processing does not alter or distort desired signals even when they have are at a very low amplitude level. Even in the presence of a very large signal whose image spur artifact is near or actually overlaps the low-level signal, the low-level signal is passed through unaltered and the interleaving artifact is subtracted out.

Note that the AFB processing is not designed to improve the SFDR of the conversion; it is designed to improve the bandwidth of the conversion while maintaining the original SFDR of the converters. Interleaving converters increases the Nyquist bandwidth many fold, but as discussed above, the interleaving process introduces a very large distortion artifacts (typically about −40 dBc) (this artifact is not an harmonic or intermodulation product, it is a separate type of signal-related distortion caused by gain and phase mismatches between the converters in the array). The AFB algorithm of DSP 320 reduces this interleaving artifact by very accurately matching the gain and phase of the converters. This artifact is reduced to be approximately the same level as the other ADC distortion (harmonic and IMD products), so that it is not a limiting factor in the SFDR performance.

ADC manufacturers such as Analog Devices have been incorporating high-precision analog front-end sampling circuitry in its circuits which extends the sampling bandwidth of the device by up to six to eight times the Nyquist bandwidth. Therefore, these commercially-available chips may be used in the AFB configuration to improve the speed of the conversion by four to eight times. In another embodiment of the invention, wideband analog sample-and-hold or track-and-hold circuitry, the implantation of which is apparent to one of ordinary skill in the art, is incorporated in the receiver 210 to improve the bandwidth even more.

AFB processing enables direct IF sampling of wideband data at high IF frequency or direct synthesis of wideband data at high IF frequency, which dramatically reduces or eliminates much of the RF electronics in the system. Advanced filter bank architectures and related DSP techniques are described in greater detail in U.S. Pat. Nos. 6,177,893; 6,339,390; and 6,388,594; the entire disclosures of which are herein incorporated by reference. These patents are commonly-owned by the present Assignee.

In another embodiment of the invention, the digitizer 210 operates in a linearity compensation (LinComp) DSP mode. A LinComp linearizer is an effective, computationally-efficient, real-time digital signal processing method to significantly reduce harmonic and intermodulation distortion by up to 24 dB over an extremely wide range of input frequencies, signal types, and amplitudes. The technology uses a unique approach to predicting nonlinear distortion and subtracting out the errors. The processing significantly improves the performance of analog-to-digital converters or the combination of devices in a RF receiver chain (e.g., amplifiers, mixers, converters). This technology significantly improves the dynamic range, which enables very accurate and efficient sampling of wideband signals at high intermediate frequencies (IF) or directly at high RF. This eliminates stages of downconversion electronics and thereby lowers the power, mass, and cost while improving performance. The linearizer is based on a phase-shift functional model which has been successfully demonstrated with devices that exhibit traditional nonlinear characteristics (e.g., second and third order harmonics and intermodulation due to compression effects in amplifiers). Distortion that varies across frequency and amplitude are accurately predicted and subtracted from the output.

During calibration, the underlying nonlinear behavior of the digital receiver 210 is characterized, and the model is valid for any arbitrary signal types. The LinComp algorithm uses a generalized functional linearity error model to predict the distortion, which is then nulled in the output.

LinComp significantly improves the performance of analog-to-digital converters (ADCs), digital-to-analog converters (DACs), sample-and-hold circuitry, buffer or power amplifiers, or the combination of these devices in an RF chain. This technology improves the dynamic range by up to four bits, enabling very accurate conversion and synthesis of data at high intermediate frequencies (IF) or directly at RF with very high sample rates. By eliminating much of the analog electronics, the high-performance linearizer can significantly reduce the size, power, and cost of radar systems, RF transceivers, and wireless communications systems by performing more of the processing digitally in reconfigurable software.

The processing can be performed in real-time and can be implemented in standard commercially-available FPGA hardware, custom VLSI, a DSP chip, or a software algorithm. It is a general linearity compensation method that is easily re-calibrated; therefore, systems using the linearizer can easily be upgraded to higher performance by incorporating new converter or amplifier technology as it becomes available in the future, thereby maintaining its significant performance advantage.

Linearity errors cause harmonic distortion and intermodulation distortion which can limit the performance of state-of-the-art electronic systems, such as radar systems, digital transceivers for wireless communications, laboratory test equipment, medical imaging, and audio and video compression. Reducing errors in digital-to-analog converters, analog-to-digital converters, sample-and-hold circuitry, and buffer and power amplifiers can significantly improve the performance of the critical conversion process.

LinComp is a general linearity error compensator that accurately nulls harmonic distortion and intermodulation distortion for a wide range of electronic devices, and it corrects errors for arbitrary wideband signals as well as sinusoidal signals. It is not simply a notch filter used to filter out unwanted signals nor is it limited to sinusoidal input signals. It characterizes the underlying nonlinear behavior of the device and the model is valid for any arbitrary signal types. LinComp architectures and related DSP techniques are described in greater detail in U.S. Pat. Nos. 6,198,416; 6,344,810; 6,424,275; 6,570,514; 7,940,198; and 8,085,175; the entire disclosures of which are herein incorporated by reference. These patents are commonly-owned by the present Assignee.

One method of calibrating the linearizer involves injecting known test signals into the device to characterize its linearity error distortion profile. A set of 10 to 15 multi-tone test signals with varying center frequency and spacing is used to measure the resulting harmonic and intermodulation distortion components. For each test signal, a buffer of approximately 128K samples is captured and the FFT spectrum is analyzed to measure the relative amplitude and phase shift of each of the distortion components. The results are tabulated, and composite transfer functions are calculated for the selected distortion components. A higher order polynomial function is fit to the composite transfer functions to form the composite nonlinear distortion model, which represents the typical distortion behavior of the device. The calibration data is processed with the composite nonlinear distortion model and digital FIR filters are fit to the measured amplitude and phase variation across the desired frequency band. The digital FIR filters are key components that allow precise cancellation of the nonlinear distortion components as they vary over frequency.

Figure 5:
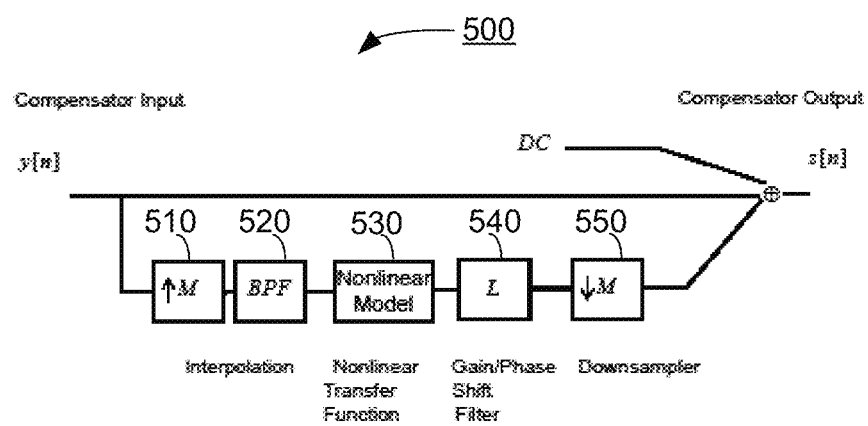
FIG. 5 illustrates a block diagram of a LinComp linearizer according to an embodiment of the invention.

FIG. 5 illustrates a block diagram of a LinComp linearizer 500 according to an embodiment of the invention. The linearizer 500 serves as a general linearity error compensator that accurately nulls distortion by subtracting a distortion signal e[n] with an output signal y[n] to produce a compensated output signal z[n], such that:

$$y[n]-e[n]=z[n]$$

The linearizer 500 comprises an upsampler 510, a band-pass filter 520, a nonlinear transfer function circuit 530, a gain/phase shift filter 540, and a downsampler 550. The inclusion of the upsampler 510, the band-pass filter 520, and the downsampler 550 is optionally employed in order to perform interpolation, the implementation of which is apparent to one of ordinary skill in the art. Interpolation increases the bandwidth of the distortion compensator 500 by estimating the compensator input signal, y[n], at intermediate points. This allows the compensator 500 to properly resolve harmonic and intermodulation distortion components that exceed the Nyquist bandwidth of the sampled system. In operation, the upsampler 510 increases the sampling rate of the compensator input signal, y[n], by a factor of M. The band-pass filter 520 preserves the fundamental content of the compensator input signal, y[n], by removing content above and/or below the original Nyquist limit of the signal. The downsampler 550 decreases the sampling rate to the original sampling rate of the compensator input, y[n]. The downsampler 550 is coupled to an adder as shown. The gain/phase shift filter 540 is used to accurately adjust the distortion components such that they are canceled in the compensated output over a wide frequency range. The gain/shift filter 540 may be implemented before, after, or both before and after the interpolation upsampler 510 and the band-pass filter 520.

The linearizer 500 can be implemented efficiently with finite impulse response (FIR) filters, look-up tables, and adders. Digital signal processing with relatively low order FIR filters (e.g., typically length 16) can be used to implement the linearizer algorithm. Standard, commercially-available FPGA chips are capable of digital signal processing at approximately 300 MHz data rate. For data rates higher than 300 MHz, the processing can be transformed into simultaneous parallel channels, for example, using polyphase filtering structures. For example, 1.5 GHz data can be demultiplexed into 8 lower data rate (187.5 MHz each) channels for real-time parallel processing in a standard FPGA.

Figure 6:
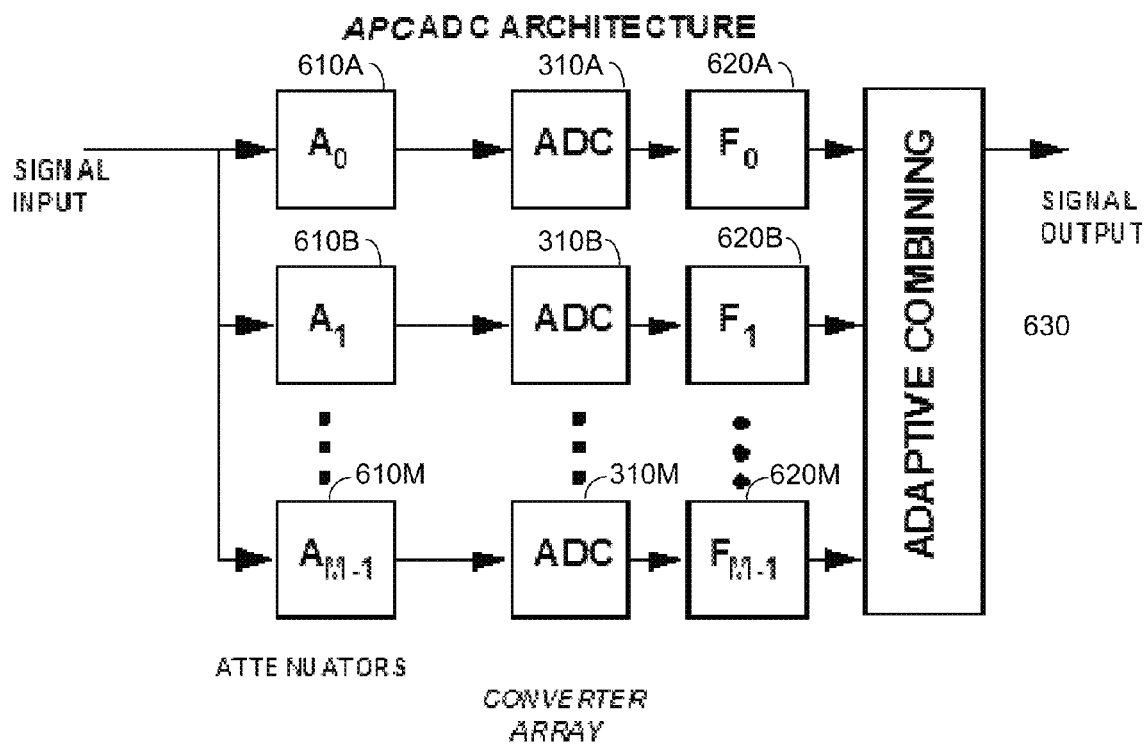
FIG. 6 illustrates an adaptive parallel combining architecture according to an embodiment of the invention.

In another embodiment of the invention, the digitizer 210 operates in an adaptive parallel combining (APC) DSP mode. FIG. 6 illustrates an adaptive parallel combining architecture 600 according to an embodiment of the invention. The APC architecture 600 comprises a parallel array of ADCs 310A-N with fixed attenuators 610A-N to allocate a range of input power to each ADC 310, and APC filters 620A-N. The APC filters 620A-N correct for amplitude, phase, and DC-offset mismatches between the converters 310A-N. The APC processing optimally combines the parallel signals to improve both SNR and SFDR.

Signal-to-Noise Ratio (SNR) is the ratio of the RMS signal amplitude to the RMS value of the sum of all other spectral components, excluding the first five harmonics and dc. Generally speaking, SNR is a measure of the random noise level of the system. The Spurious-Free Dynamic Range (SFDR) is the ratio of the RMS signal amplitude to the RMS value of the peak spurious spectral component (such as harmonic distortion). SFDR is a measure of the dynamic range of the system. ADC manufacturers typically limit harmonic distortion spurs (as measured by SFDR) introduced by the converter to values on the order of the quantization error (as measured by SNR). This distortion typically limits the dynamic range of the converter to approximately 6n where n is the number of bits in the converter (i.e., spurious harmonics are approximately 6n dB below the input signal).

Since the SNR and SFDR are ratios, as the input signal level decreases, the SNR and SFDR decrease proportionally. For example, a standard 12-bit ADC ideally has ~72 dB SNR (approximately 6n) for input signals near full-scale of the ADC. As the input level decreases, the SNR decreases proportionally (e.g., if the input level is decreased to −10 dBFS, then the SNR is decreased to ~62 dB). The same applies to SFDR. System designers typically use automatic gain control circuits to monitor the level at the input to the ADC and adjust the gain to keep the input level near full scale without overranging to maximize SNR and SFDR. A variable gain amplifier with a feedback monitoring circuit is typically used to maintain the input level near approximately −10 dBFS (this 10 dB pad is used to avoid clipping the ADC, but it also reduces the useful SNR and SFDR by 10 dB).

Each ADC 310A-N in the converter array is allocated its own fixed attenuator 610A-N, $A_k$. For example, four 12-bit ADCs 310 can use attenuators 610 that are multiples of 18 dB (i.e., $A_0$=0 dB, $A_1$=−18 dB, $A_2$=−36 dB, and $A_3$=−54 dB).

This effectively allocates a range of input signal levels to each ADC 310 in the array. Adaptive combining circuitry 630 is used to combine the ADC outputs to maximize the SNR and SFDR.

Figure 7:
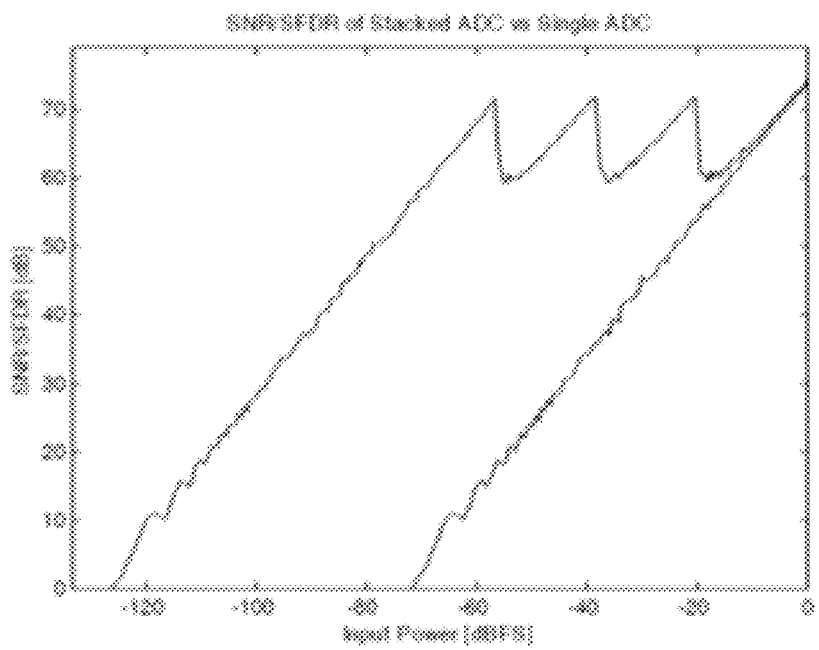
FIG. 7 illustrates the SNR/SFDR of an adaptive parallel combining architecture that employs 4 parallel 12-bit ADCs and 18 dB attenuators with adaptive combining compared to SNR/SFDR of conventional single ADC system.

In an embodiment of the invention, adaptive combining circuitry 630 digitally switches to the ADC 310 with the smallest level of attenuation that is not near clipping. Since all four ADCs 310 are running simultaneously, they can be digitally switched instantaneously using a digital comparator and a digital switch. As the input signal level increases, the processing instantaneously switches to the ADC 310 with the maximum available SNR and SFDR. As shown in FIG. 7, this dramatically improves the SNR and SFDR over a much greater range input signal levels than a conventional single ADC system. As noted above, the SNR and SFDR typically degrade linearly as the input level is decreased, as shown in the single ADC performance plot (dashed line). However, the APC approach provides up to a 54 dB increase in SNR and SFDR. The average performance improvement is 26 dB (averaged over the entire input signal range 0 dBFS to −128 dBFS).

One important element to the APC approach is the use of adaptive finite impulse response (FIR) filtering to correct gain, phase, and DC-offset mismatches between the parallel ADCs. The performance of the adaptive parallel combining would be severely degraded without this mismatch correction, since the adaptive parallel combining is constantly switching among the ADCs in mid-waveform. Mismatches would introduce discontinuities in the waveform that translate to large distortion spurs in the ADC output spectrum. The adaptive parallel combining filters 430A-M very accurately correct these mismatches and significantly reduce the sensitivity to the analog characteristics (e.g., differing line lengths, amplifier gain matching, etc.).

In an embodiment of the invention, the adaptive parallel combining filters 430A-M are implemented with, for example, 32-tap FIR filters. The filter coefficients and data paths can be quantized to less than 12 bits (since each of the parallel converters is only operating over a portion of its input signal level range), which greatly simplifies the processing. This digital signal processing can be effectively implemented in fixed-point arithmetic and fits easily within standard real-time FPGA hardware. APC architectures and related DSP techniques are described in greater detail in U.S. Pat. No. 6,473,013; the entire disclosure of which is herein incorporated by reference. These patents are commonly-owned by the present Assignee.

Averaging the outputs of an array of ADCs is a technique that can be used to statistically reduce the noise in the conversion and thereby improve the SNR. The noise is lowered by 3 dB per the doubling of the number of converters in the array. For example, averaging two converters provides 3 dB improvement in SNR, while averaging four converters provides 6 dB improvement in SNR (1 bit improvement in resolution). This is an effective technique to improve resolution in a system without sacrificing bandwidth.

In another embodiment of the invention, the digitizer 210 implements one or more of the following DSP techniques. For example, an array of analog-to-digital converters can be used to simultaneously digitize numerous different signals (e.g., antenna element outputs). Often these channels need to be coherent (e.g., for digital beamforming) so matching the channels in gain and phase is crucial. Digital FIR filters can be used to compensate for frequency-dependent gain and phase mismatches. The gain and phase can be even be calibrated for the entire signal chain (e.g., RF antenna input through down-conversion electronics and into the ADC), which significantly eases the analog matching requirements in the front-end electronics. This translates to lower cost components and much less manual tuning of the system. Similarly, digital FIR filters can be used to compensate for gain or phase anomalies present in the digitizer, such as gain ripple and phase distortion in anti-aliasing filters and analog bandwidth roll-off. Also, clock phasing can be adjusted for 90 degrees between adjacent converters to provide I/Q demodulation. Digital FIR filtering can be calibrated to insure the I and Q channels are accurately balanced. Narrowband signals can be extracted with high precision using a digital bandpass FIR filter, which provides resolution enhancement by filtering out-of-band noise.

Testing successfully demonstrated the capabilities of the wideband, wide dynamic range, adaptively controlled the digital receiver 110 that is dynamically reconfigurable to optimize the performance for the current signal environment. Three architectures based on different state-of-the-art based ADC chips were evaluated (i.e., a system with four 14-bit, 400 MSPS ADCs, a system with four 12-bit, 1 GSPS ADCs, and a system with four 10-bit, 1.25 GSPS ADCs) to demonstrate the flexibility of this general approach to provide different bandwidth, resolution, and power capabilities. ADC data was gathered and analyzed and the above-noted DSP techniques were used to demonstrate how the digital receiver 110 can be adaptively reconfigured for multiple different modes (such as an extremely wideband, lower resolution mode for broadband monitoring, and a very high-resolution narrowband mode for channel analysis). The approach to background monitoring of the changing signal environment and adaptively updating the receiver parameters (e.g., DSP techniques, channelization parameters) was investigated and evaluated.

The digital receiver 110 was demonstrated to provide the following performance breakthroughs: AFB DSP processing quadruples bandwidth; LinComp DSP processing provides 20 dB improvement in SFDR; averaging DSP provides 6 dB improvement in SNR; dynamic digital channelizer 220 provides multiple independently tuned channels; simultaneous wideband and narrowband high-resolution outputs; and signal detection algorithm 240 identifies signals of interest and jammer/interference using spectral, statistical, and wavelet analysis.

The results of the testing were used to select an architecture based on two dual-channel National Instruments ADC12D1800 12-bit, 1.8 GSPS ADCs to provide the following digital receiver 110 performance. The software reconfigurable digitizer provides an instantaneous bandwidth of 900 MHz-3.6 GHz (using AFB DSP processing), a SFDR>90 dB (using LinComp DSP processing), a SNR=60 dB-66 dB (using averaging DSP processing), and variable sensitivity (using APC DSP processing). FPGA processing resources are 9,000 to 18,000 Xilinx slices (18%-36% of Virtex 6 XC6VSX315 FPGA). Size and power consumption are 3-6 W (FPGA) or <1 W (ASIC) (varies depending on DSP modes selected) and 2.2-8.8 W for the ADCs (depending on number ADCs being used simultaneously).

The following modes of operation are some examples of the possible configurations for the digital receiver 110 by selecting the appropriate DSP algorithms. The use of four ADCs 310A-D is exemplary only. In all modes as shown in the following FIGS. 8-11, the channelizer 220 and adaptive control algorithm 230 function similarly.

Figure 8:
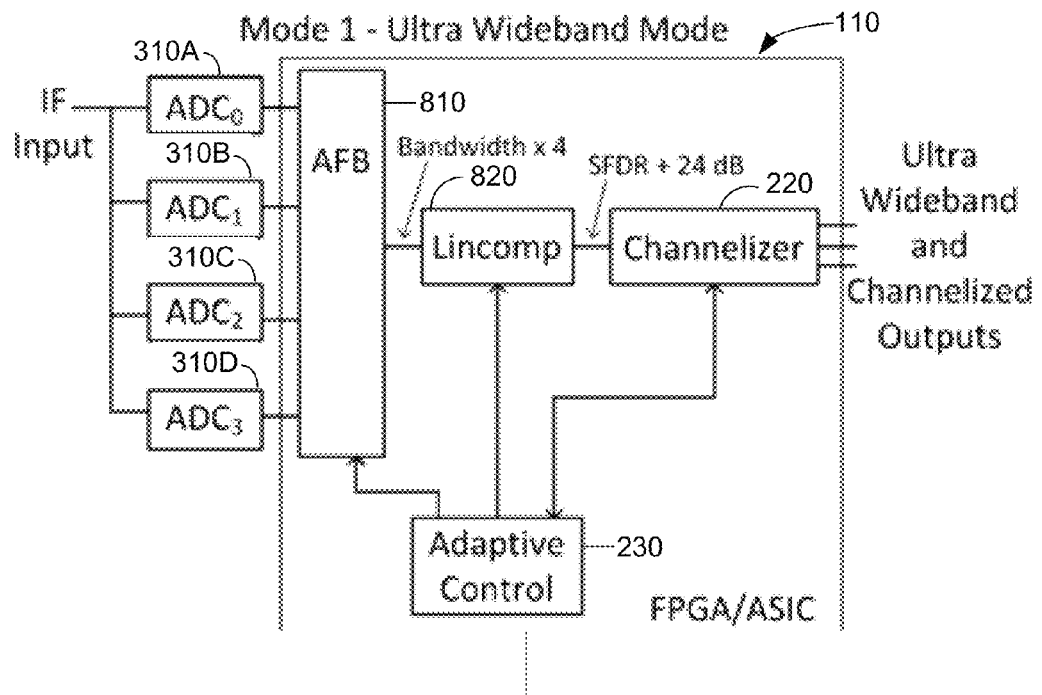
FIG. 8 illustrates the digital receiver of FIG. 1 operating in an ultra wideband mode according to an embodiment of the invention.

FIG. 8 illustrates the digital receiver 110 operating in an ultra wideband mode according to an embodiment of the invention. Here, the DSP algorithms 320 comprise an AFB algorithm 810 operating on the outputs of the ADCs 310A-D and a LinComp algorithm 820 operating on the output of the AFB algorithm 810. The AFB algorithm 810 quadruples the bandwidth. The LinComp algorithm 820 improves SFDR by approximately 24 dB. The channelizer 220 provides wideband and narrowband outputs, and the adaptive control algorithm 230 continually updates the channelizer parameters to track signals in a changing signal environment.

Figure 9:
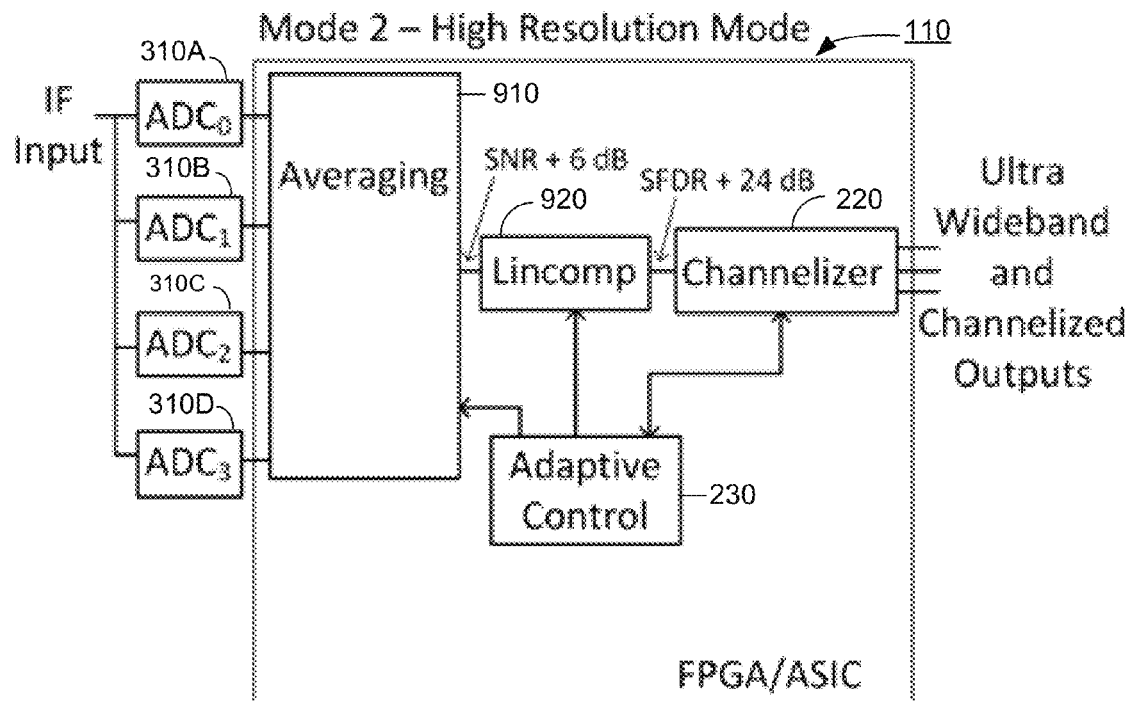
FIG. 9 illustrates the digital receiver of FIG. 1 operating in a high resolution mode according to an embodiment of the invention.

FIG. 9 illustrates the digital receiver 110 operating in a high resolution mode according to an embodiment of the invention. Here, the DSP algorithms 320 comprise an averaging algorithm 910 operating on the outputs of the ADCs 310A-D and a LinComp algorithm 920 operating on the output of the averaging algorithm 910. The array of ADCs 310A-D is combined using the averaging algorithm 910 to improve the SNR by 6 dB, and the dynamic range can be improved by approximately 24 dB using the LinComp algorithm 920. The channelizer 220 can isolate desired bands and take advantage of narrowband processing gain.

Figure 10:
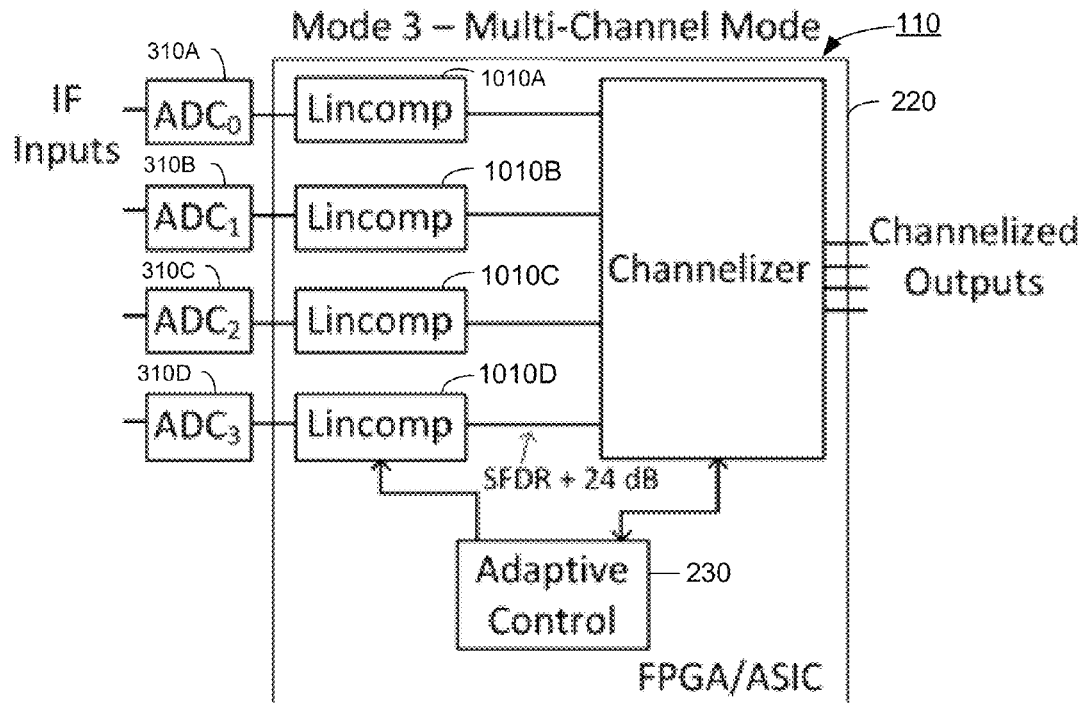
FIG. 10 illustrates the digital receiver of FIG. 1 operating in a multi-channel mode according to an embodiment of the invention.

FIG. 10 illustrates the digital receiver 110 operating in a multi-channel mode according to an embodiment of the invention. Here, the array of ADCs 310A-D is used as independent channels, wherein the dynamic range of each channel is improved by approximately 24 dB using a LinComp algorithm 1010.

Figure 11:
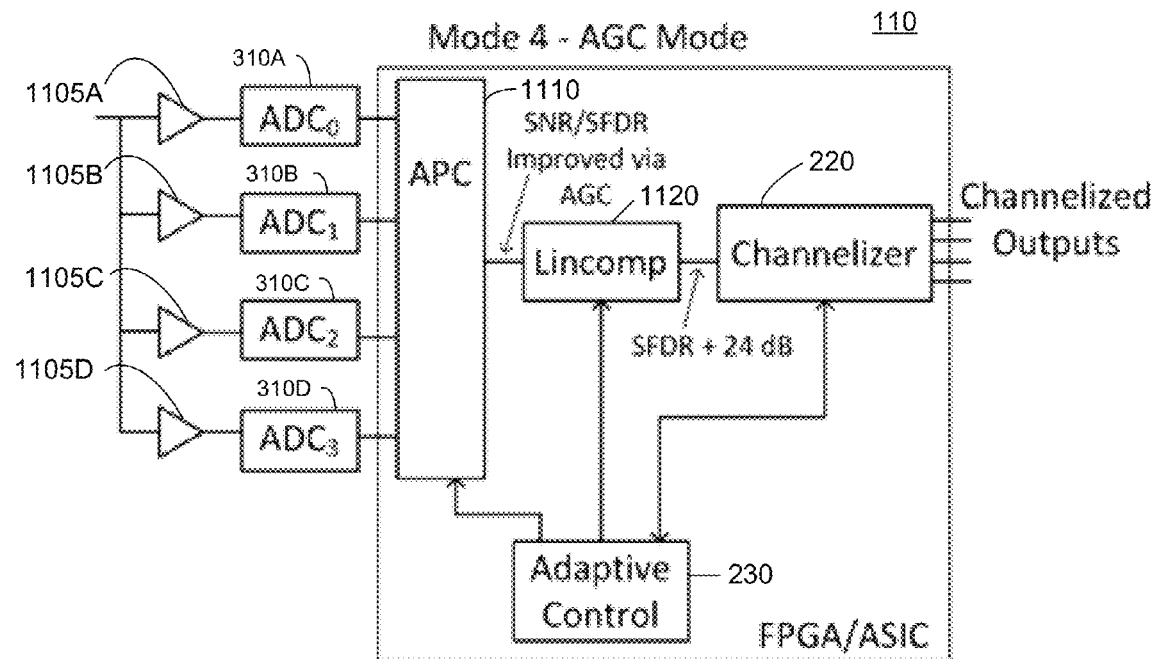
FIG. 11 illustrates the digital receiver of FIG. 1 operating in an automatic gain control mode according to an embodiment of the invention.

FIG. 11 illustrates the digital receiver 110 operating in an automatic gain control mode according to an embodiment of the invention. Here, the array of ADCs 310A-D is combined using an APC algorithm 1110 to improve the SNR and SFDR with essentially instantaneous automatic gain management. The dynamic range is improved by approximately 24 dB using a LinComp algorithm 1120. Attenuators 1105A-D may be incorporated to attenuate the signals prior to the ADCs 310A-D to allow the APC algorithm 1110 to witch to the ADC with the highest signal level that is not overloaded.

The election and control of the numerous modes of operation is performed by a combination of input from the user (via the user input interface 250, which is not shown in FIGS. 8-11) and heuristic background analysis of the current operating conditions. For example, the user can select to capture the 5 largest narrowband signals, and the adaptive receiver 110 will employ the ultra wideband mode to locate the desired signals, and the high resolution mode to capture the detected signals. The processing continually monitors the signal environment and updates the selected channels adaptively.

Figure 12:
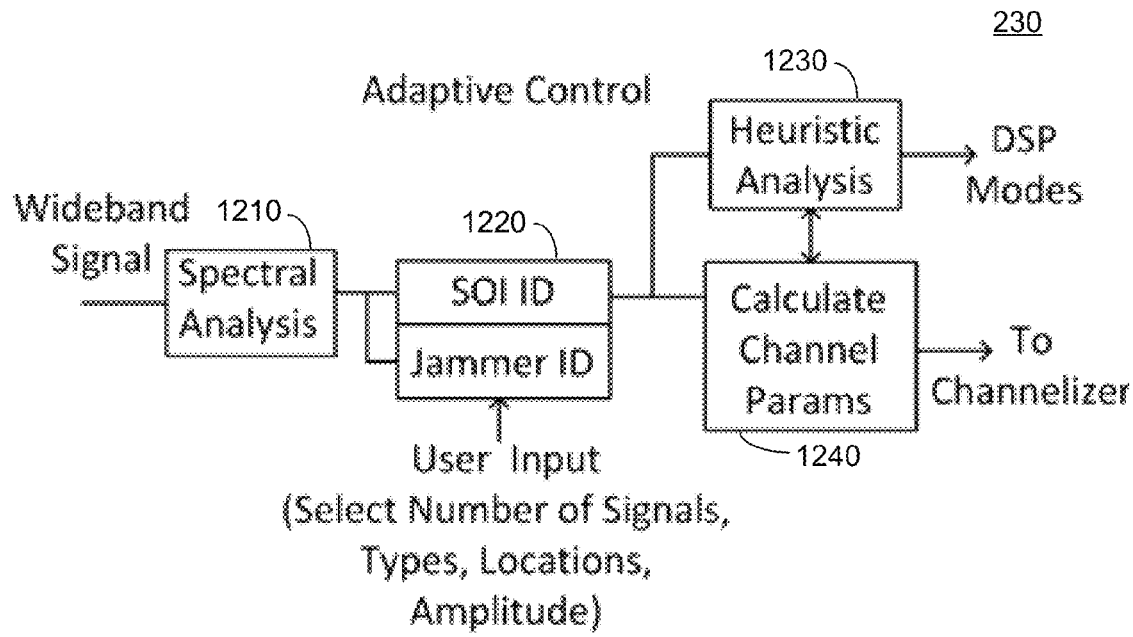
FIG. 12 illustrates the adaptive control algorithm of FIG. 2 according to an embodiment of the invention.

FIG. 12 illustrates the adaptive control algorithm 230 according to an embodiment of the invention. Particularly, the adaptive control algorithm 230 comprises spectral analysis logic 1210, identification of signal(s) of interest (SOI) and jammer(s) logic 1220, heuristic analysis logic 1230, and channel parameters calculation logic 1240. The spectral analysis logic 1210 performs spectral, statistical, and wavelet analyses of the wideband signal. The identification logic 1220 identifies signal(s) of interest (SOI) and jammers based on input from the user (e.g., number of signals, waveform types, locations, and amplitudes). The heuristic analysis logic 1230 compares the current signal environment to stored configurations to quickly optimize the performance of the digitizer 210 and the channelizer 220 to select and track signals of interest and null jammers and interference.

Figure 13:
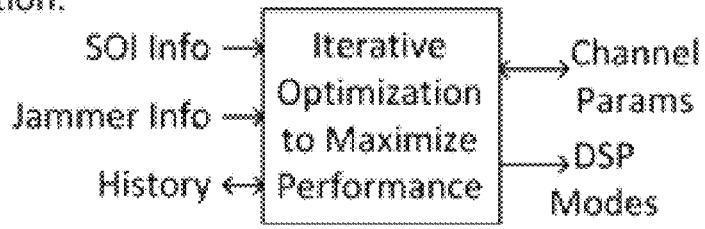
FIG. 13 illustrates a heuristic storage database according to an exemplary embodiment of the invention.

FIG. 13 illustrates a heuristic storage database 1300 according to an exemplary embodiment of the invention. The heuristic storage database 1300 comprises a history of the signal environment and the corresponding receiver 110 configuration (DSP modes, channelization parameters). Such parameters as SOI amplitude, frequency, bandwidth, and modulation type are stored, jammer/interference information, channelizer parameters, selected DSP modes, and a performance figure of merit (e.g., weighted sum of SFDR, SNR, number of signals, jammer/interference rejection, etc.). An optimization portion of the algorithm evaluates the current signal environment (SOI information, jammer/interference information), compares the current environment to the history to quickly select parameters that have already been optimized for similar situations. This technique is particularly useful for frequency-hopping signals to allow the capture of these rapidly changing signals without a lag time while the receiver system 100 reconfigures itself.

The optimization continues by iteratively adjusting the channelization parameters (number of channels, channel bandwidths, center frequencies, etc.) and the selected DSP modes (AFB for bandwidth, LinComp for SFDR, averaging for SNR, etc.) and evaluating the performance. The optimization continuously evaluates these parameters in the background the adaptively update the system configuration to track signals of interest in the changing signal environment.

Figure 14:
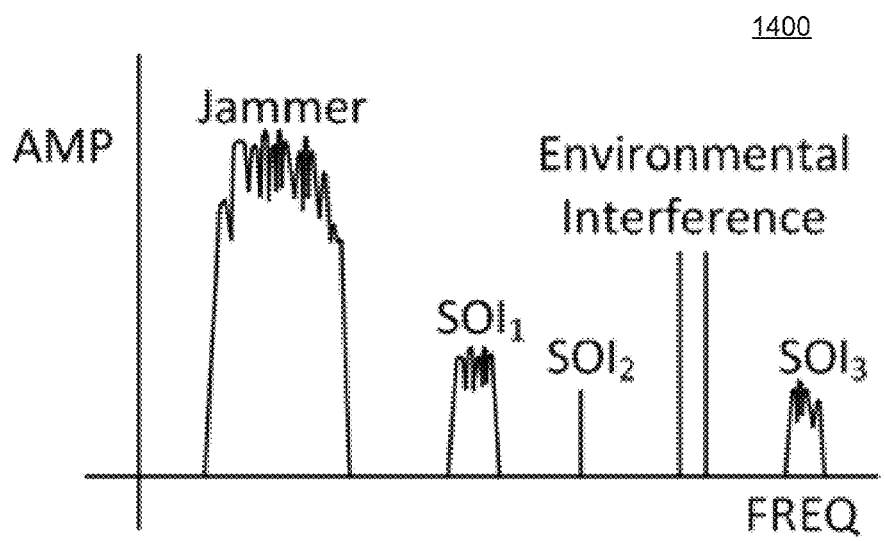
FIG. 14 depicts a detected spectrum of an exemplary signal environment.

FIG. 14 depicts a detected spectrum 1400 of an exemplary signal environment. Via input from the user and correlation with the signal environment, the digital receiver 110 identifies multiple signals of interest (shown as "$SOI_1$", "$SOI_2$", and "$SOI_3$"), a jammer signal ("Jammer"), and interference signals ("Interference"). The amplitude and location of these signals are used to specify the channel parameters for the configurable digital channelizer 220 as shown in FIG. 15.

Figure 15:
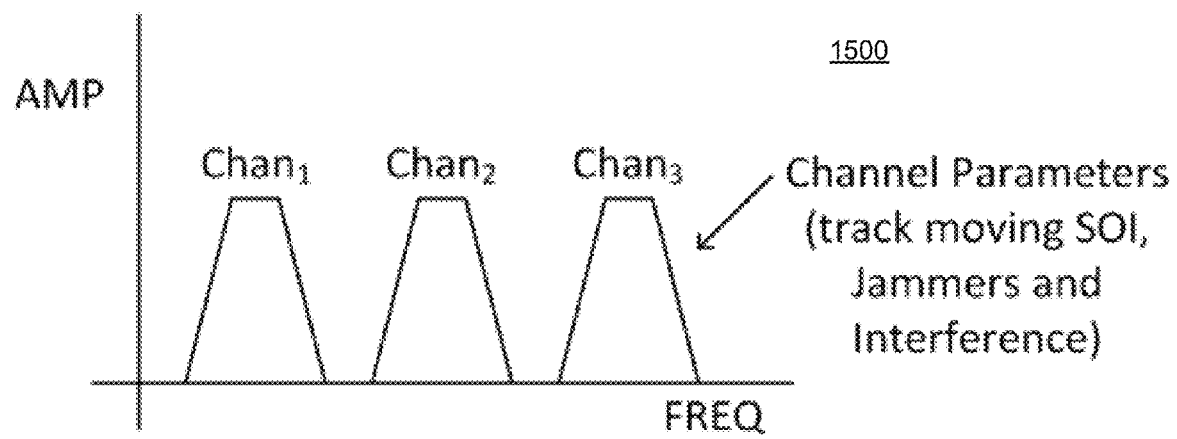
FIG. 15 depicts exemplary channelization filters that have been calculated for the signal environment shown in FIG. 14.

FIG. 15 depicts exemplary channelization filters 1500 that have been calculated for the signal environment shown in FIG. 14. For example, channel filter "$Chan_1$" selects SOL and rejects the Jammer signal and $SOI_2$. Similarly, channel filter "$Chan_2$" selects $SOI_2$ and rejects SOL and the adjacent environmental interference. Channel filter "$Chan_1$" selects $SOI_3$ and rejects the adjacent interference. This process is updated continually in the background to track changes in the signal environment.

Figure 16:
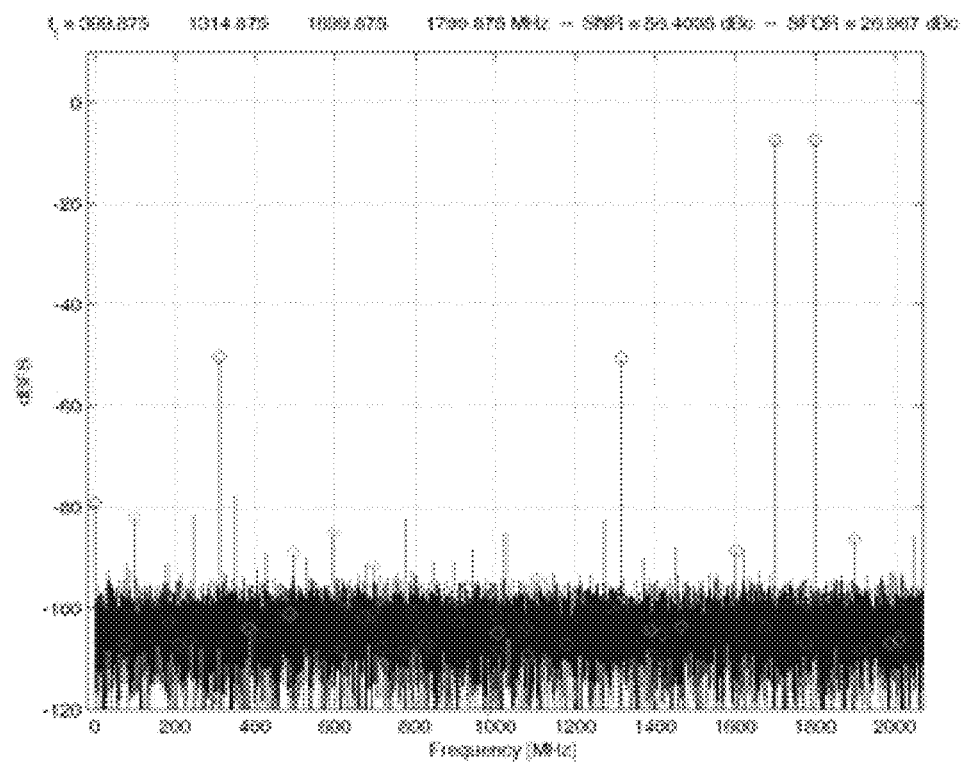
FIG. 16 shows the output of the receiver of FIG. 1, wherein the receiver was implemented in the ultra wideband mode as shown in FIG. 8.
Figure 17:
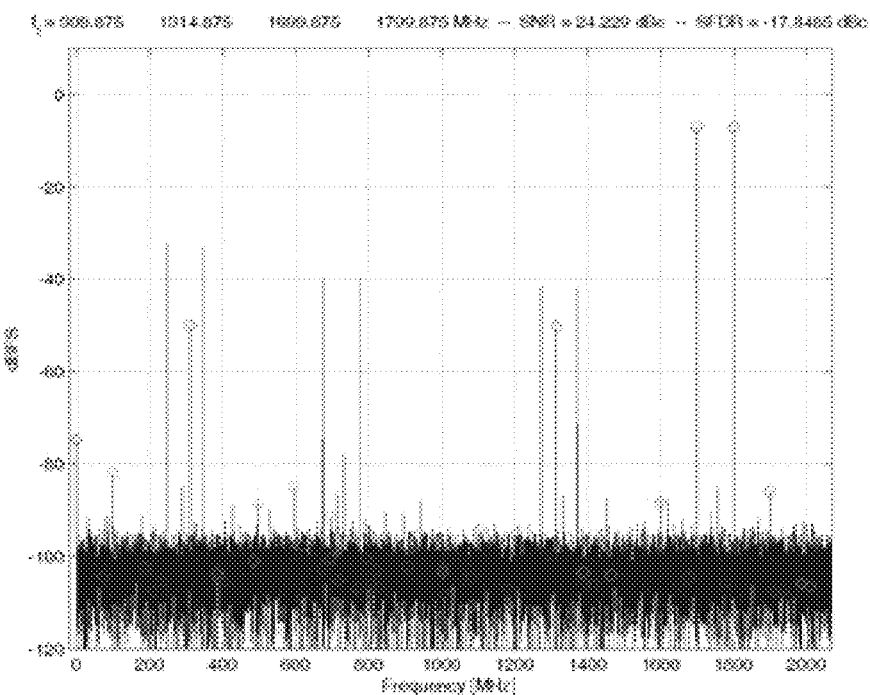
FIG. 17 shows the output of the signal detection algorithm of FIG. 2 with the AFB algorithm turned off.

The adaptive control algorithm 230 was evaluated with a simulated signal environment spanning 2 GHz instantaneous bandwidth. Four different desired signals were generated: −7 dBFS at 1700 MHz, −7 dBFS at 1800 MHz, −50 dBFS at 1315 MHz, and −50 dBFS at 310 MHz. FIG. 16 shows the output of the receiver 110, wherein the receiver 110 was implemented in the ultra wideband mode as shown in FIG. 8. Four signals of interest are identified by the adaptive control algorithm 230 and the system 100 is configured to extract high-resolution channelized versions of the signals. All four signals of interest are clearly discernible. FIG. 17 shows the output of the signal detection algorithm 240 with the AFB algorithm 810 turned off. Here, image distortion spurs are extremely large and mask two of the four desired signals. Signals at 310 MHz and 1315 MHz are masked by distortion.

Figure 18:
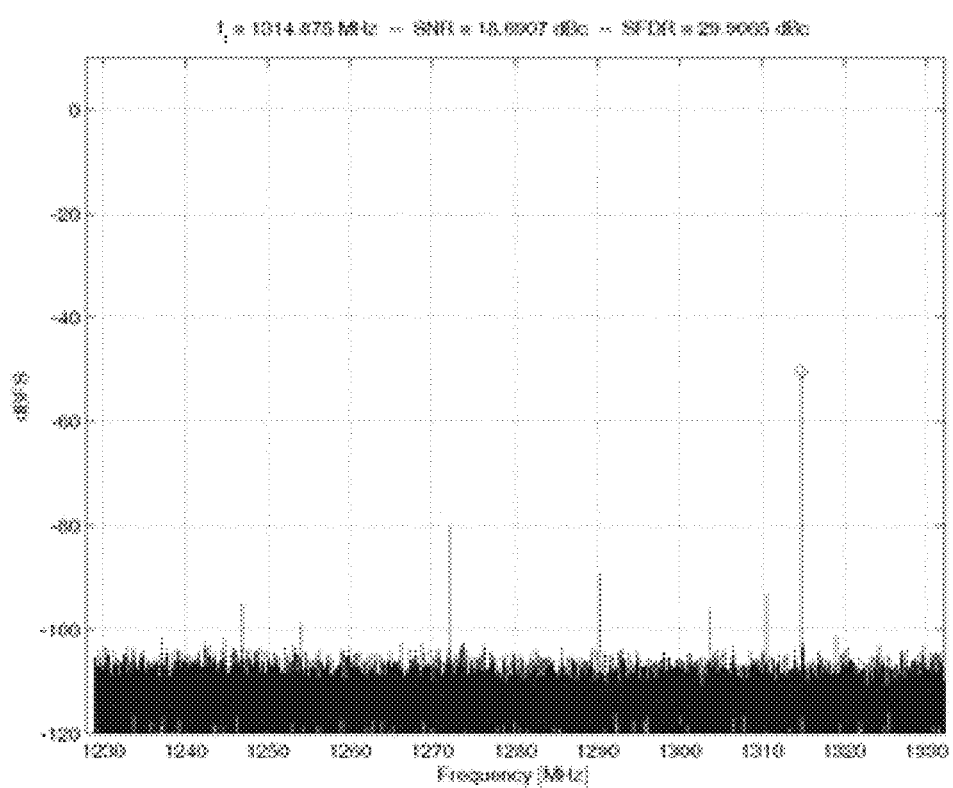
FIG. 18 illustrates the output of the signal detection algorithm of FIG. 2 where the receiver is operating in the high-resolution channelized mode of FIG. 9.

FIG. 18 illustrates the output of the signal detection algorithm 240 where the receiver 110 is operating in the high-resolution channelized mode of FIG. 9. Here, one of the signals of interest has been extracted from the wideband input signal using the adaptive control algorithm 230. Particularly, the signal at 1315 MHz has been channelized, downsampled, and processed by the digitizer 210 to provide high-resolution signal extraction. Note that this channelized data is provided simultaneously with the wideband data of FIG. 16. The algorithm 230 also continuously updates the configuration to track signals as they move. The other signals of interest may be similarly extracted.

Figure 19:
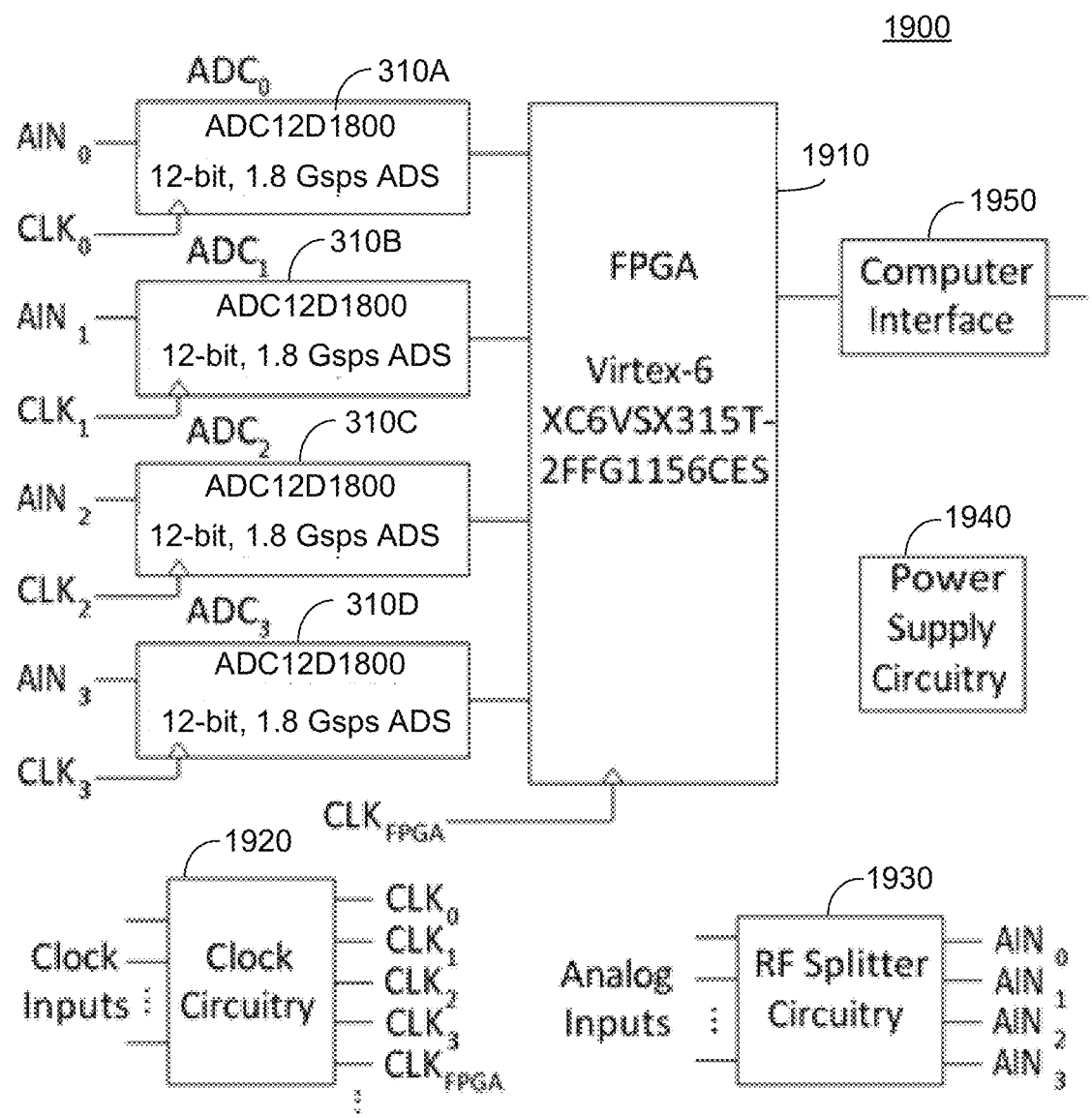
FIG. 19 illustrates hardware of the digital receiver of FIG. 1 according to an exemplary embodiment of the invention.

FIG. 19 illustrates hardware 1900 of the digital receiver 110 according to an exemplary embodiment of the invention. The digital receiver 110 comprises four 12-bit 1.8 GSPS ADCs 310A-D from Texas Instruments connected to a Xilinx Virtex-6 XC6VSX315 FPGA 1910. The hardware 1900 is implemented on a printed circuit board that includes clock circuitry 1920 to condition the ADC clocks and the FPGA clock, RF splitter circuitry 1930 to route the incoming signal(s) to the ADCs, power supply circuitry 1940s, and a computer interface 1950 for top-level control and performance evaluation.

The dynamically reconfigurable digital receiver approach described above overcomes the critical digitization bottleneck that limits performance of state-of-the-art radio frequency transceiver systems. Many high-performance modern electronic systems will benefit from the techniques. Significant applications include enhancement of RADAR systems, electronic warfare and signal intelligence receivers, cognitive radios, wideband universal RF transceivers, specialized test equipment, and medical imaging systems. This approach adds critical levels of adaptivity earlier in the receiver signal chain to optimize the digitizer's hardware capabilities (e.g., instantaneous bandwidth, spurious free dynamic range, signal to noise ratio, signal gain) based on the current signal environment, and to quickly adapt to changes in the environment.

These technologies described herein provide efficient detection, processing and control for adapting digital channelizer attributes to the dynamic modern telecommunications environment. The dynamic nature of the modern RF environment presents challenges to future digital receivers. Current fixed channel receivers are inadequate to efficiently process a dynamic RF environment such as that found in the modern battlefield. An adaptive channelizer with dynamically alterable attributes provides significant improvements in detection, analysis and timely dissemination of signal characteristics and electronic order of battle information. Such channelizer attributes include the number of frequency channels, independently variable channel bandwidths, channel center frequencies, sensitivity and dynamic range. These techniques are general and applicable to a variety of receiver system paradigms. Initial analyses and results will apply to the signal intelligence realm of 0.5-18 GHz tuning range with 900 to 3.6 GHz instantaneous bandwidth. Algorithms and architectures of the present invention are scalable, efficient and readily modifiable. For example, the open architecture approach of the present invention allows the inclusion of existing military algorithms and future algorithm enhancements and additional capabilities.

The present invention (including ADCs, FPGA, clock and signal splitter circuitry, and adaptive processing) can be implemented in a compact printed-circuit board with discrete components (using all COTS parts) for an immediate solution, or it can be implemented in a custom ASIC to significantly reduce size, power consumption and heat dissipation.

In addition to military applications, the following applications will benefit from the present invention. One particularly attractive application of the present invention is the software-defined cognitive radio, which can accommodate two or more RF modulation standards simultaneously by performing tuning and demodulation on the digital data in software. The cognitive radio can seamlessly integrate new standards as they arise. The cognitive radio promises lower power, smaller size, and lower cost by processing 50 or more channels in software instead of dedicated hardware. For military applications, the cognitive radio is capable of understanding many different signaling protocols with a compact, low-power transceiver. For cellular telephone applications, the cognitive radio allows for universal coverage without necessitating worldwide agreement on a single standard since it can understand signals from many different types of cellular telephones. The radio can also dynamically allocate channels to unused portions of the spectrum and adapt to a crowded signal spectrum.

Space Division Multiple Access (SDMA) is used to improve communications capacity, reduce jamming and interference, and improve security by using spatial processing for intelligent beam steering (for both transmission and reception). Current systems are limited by converter bandwidth and precision; adaptive algorithms require wide dynamic range to accurately null interfering signals. The present invention overcomes SNR and SFDR limitations.

Achieving high-performance A/D conversion is currently the limiting factor in the cost, size, and power consumption of many electronic systems. For example, improving performance in radar systems and radio frequency (RF) receivers can provide critical dynamic range to handle very high-power co-site interference without overloading the receiver and still accurately receiving very low-level desired signals, eliminate numerous of analog components by performing more of the processing digitally, enable simultaneous support of multiple analog and digital signaling and protocols, seamlessly support next generation standards with software updates, and reduce power, mass, volume and cost. A high-performance receiver system employing the present invention significantly improves performance (e.g., bandwidth, capacity, bit-error rate (BER), power consumption) in a compact, software programmable, easily updateable hardware solution.

The invention has been described herein using specific embodiments for the purposes of illustration only. It will be readily apparent to one of ordinary skill in the art, however, that the principles of the invention can be embodied in other ways. Therefore, the invention should not be regarded as being limited in scope to the specific embodiments disclosed herein, but instead as being fully commensurate in scope with the following claims.

We claim:

1. A reconfigurable digitizer comprising:
an array of analog-to-digital converters, and
digital signal processing logic, wherein the digital signal processing logic is reconfigurable based on input from a user or a detected signal environment, wherein reconfiguring the digital signal processing logic changes an operating parameter of the array of analog-to-digital converters, wherein the operating parameter is selected from the group consisting of: bandwidth, resolution, sensitivity, dynamic range, and any combination thereof.

2. The reconfigurable digitizer of claim 1, wherein the digital signal processing logic is continually updated based on the detected signal environment.

3. The reconfigurable digitizer of claim 1, wherein the array of analog-to-digital converters can be reconfigured to operate in a plurality of modes.

4. The reconfigurable digitizer of claim 3, wherein the plurality of modes are selected from the group consisting of: wideband mode, high resolution mode, multi-channel mode, automatic gain control mode, and any combination thereof.

5. The reconfigurable digitizer of claim 4, wherein the wideband mode combines the outputs from two or more analog-to-digital converters in the array of analog-to-digital converters.

6. The reconfigurable digitizer of claim 4, wherein the high-resolution mode averages the outputs from two or more analog-to-digital converters in the array of analog-to-digital converters.

7. The reconfigurable digitizer of claim 4, wherein the multi-channel mode uses each analog-to-digital converter in the array of analog-to-digital converters as an independent channel.

8. The reconfigurable digitizer of claim 4, wherein the automatic gain control mode allocates a level of gain to each analog-to-digital converter in the array of analog-to-digital converters.

\* \* \* \* \*